United States Patent
Willis

[11] 3,864,788
[45] Feb. 11, 1975

[54] SCALLOP SPREADING MACHINE
[75] Inventor: Elmer D. Willis, Williston, N.C.
[73] Assignee: Willis Brothers, Inc., Williston, N.C.
[22] Filed: Nov. 19, 1973
[21] Appl. No.: 417,125

[52] U.S. Cl............................ 17/53, 17/71, 17/45, 259/2, 99/635
[51] Int. Cl............................................ A22c 29/00
[58] Field of Search............... 17/53, 54, 71; 99/635

[56] References Cited
UNITED STATES PATENTS
3,163,234  8/1963  Boyer................................ 99/635 X
3,454,067  7/1969  Smeltzer et al...................... 99/635

Primary Examiner—Louis G. Mancene
Assistant Examiner—James D. Hamilton
Attorney, Agent, or Firm—Finnegan, Henderson, Farabow & Garrett

[57] ABSTRACT

A scallop spreading machine is provided on a scallop eviscerator having rollers mounted on an eviscerator frame in an inclined path. The spreading machine includes a number of support frames extending across the inclined path of the eviscerator frame at spaced locations. A plurality of spreader fans, each including a plurality of radially extending blades having flexible wiping elements are mounted on each support in side-by-side relationship. Drive means are provided to rotate the spreader fans in a plane aligned with the inclined path. Adjustment means are provided to vary the height of the spreader fans above the eviscerator rolls. As they rotate, the wiping elements break up the clumps or piles of scallops which tend to form and distribute the scallops evenly on the rollers to position them so as to be subjected to the action of the eviscerator. The spreader fans also force the scallops back up the inclined path to lengthen the time the scallops are subjected to the action of the eviscerator. The height adjustment permits the spreader fans to be adjusted according to the size of the particular scallop batch being processed.

9 Claims, 5 Drawing Figures

SCALLOP SPREADING MACHINE

BACKGROUND OF THE INVENTION

This invention relates to the processing of scallops, and more particularly relates to an apparatus for extracting the adductor muscle from scallops.

The preparation of scallops for human consumption involves shucking - the separation of the meat (adductor muscle with attached viscera) from the shells - and eviscerating - the separation of the adductor muscle from the viscera which clings to the periphery of the muscle. Although the viscera of scallops is usually considered to be edible, only the cylindrical adductor muscle is commonly sold for human consumption.

Apparatus for mechanically eviscerating scallops has been recently developed which has greatly diminished the problems encountered in mechanically eviscerating scallops. This apparatus is described in my U.S. Pat. No. 3,665,555 which is hereby incorporated by reference and comprises a plurality of counter rotating rollers which are arranged to form an inclined path that descends from the input end of the eviscerator. Each of the rollers has its axis aligned transversely of the path and is positioned so that the surface of each intermediately positioned roller forms a nip with the adjacent roller on its input side and a nip with the adjacent roller on its output side. Drive means oscillate the rollers so that the upper exposed portion of adjacent rollers are alternately rotated towards each other to pull viscera from the scallop muscles and through the nip of the rollers, and alternately rotated away from each other to permit the lower roller to advance the scallop down the inclined path. Cleaning means remove the viscera from the underside of the rollers.

This machine depends upon the rollers to perform the function of bringing the viscera to the nip of the rollers where the viscera can be pulled from the muscle. The size and spacing of the rollers determines the efficiency of the rollers in accomplishing this function of feeding the viscera to the nip of the rollers. The choice of roller size and spacing is to some extent a direct function of the diameter of the scallop muscle, although others factors such as muscle firmness also have an effect. Scallop muscles, for a single scallop species, vary in diameter due to such factors as seasonal spawning activity.

The problem of feeding viscera into the nips of the rollers is particularly serious when processing a variety of scallops known as sea or ocean scallops because these scallops can vary widely in diameter. A roller of a given diameter may efficiently feed scallops and attached viscera when the scallop muscle is a given diameter, and be very inefficient when processing scallop muscles of a significantly larger or smaller diameter.

Scallop muscles with attached viscera have been fed to roll eviscerators by an endless conveyor that drops the scallops onto the top portion of the bank of rollers. Such an arrangement tends to cause the scallops to bunch up and does not distribute the scallops uniformly across the length of the rollers. This uneven distribution lowers the efficiency of the eviscerator and makes it necessary to use more rollers than would be necessary if more uniform distribution of scallops could be attained.

Various attempts have been made to more efficiently present scallops having attached viscera to the nips of counter-rotating roll eviscerators. These have included attempts by workers to manually distribute scallops across the top of the roller eviscerator and to manually push individual scallops into the nip of the rollers at the bottom of the eviscerator. Hand-manipulated, flexible members have also been used to push the scallops into the nip of the rollers.

One improvement for feeding scallops into the nip of the rollers is disclosed in my U.S. application for Patent, Ser. No. 332,188, filed Feb. 13, 1973, which discloses a plurality of spaced spreader bars which are reciprocated relative to the rollers in a plane above the rollers to thereby force the scallops back up the inclined path and lengthen the time the scallops are subjected to the action of the eviscerator.

SUMMARY OF THE INVENTION

The present invention provides a scallop spreading device for use with a scallop eviscerator formed by a plurality of counter-rotating rollers rotatably mounted on a frame to form an inclined path, with the axes of the rollers aligned transversely of the path. The spreading device of the present invention comprises at least one support frame mounted on the eviscerator frame and extending across the inclined path of the eviscerator frame, adjustment means connected to said support frame for varying the height of said support frame above the eviscerator rollers, at least one rotary spreader fan mounted on said support frame having an axis of rotation extending in the direction of the rollers, said axis being substantially perpendicular to the plane of the rollers, and said fan having blades radiating outwardly from said axis for distributing the scallop meats more evenly on the rollers, lengthening the time the scallops are subjected to the action of the eviscerator rollers and urging the scallops into the nips of the rollers, and drive means connected to said support frame for rotating said spreader fan blades in a plane parallel with the inclined path. Preferably, each spreader has radially extending blades with flexible wiping elements lying in a plane above and parallel to the plane of the rollers.

The blades of the spreader fans break up the clumps or piles of scallops and distribute them more evenly on the rollers to position them so as to be subjected to the action of the eviscerator. During one-half of their cycle of rotation, the blades of the spreader fan force the scallops back up the inclined path to lengthen the time the scallops are subjected to the action of the eviscerator rollers and subject the scallops to additional eviscerating action. The blades of the spreader fans also turn the scallop meat to rotate the viscera to a position at the nip of the rollers and urge larger size scallops into the nip of the rollers so that the viscera can be effectively removed. The height adjustment means of the present invention enables the spreader fans to be adjusted according to the size of the particular scallop batch being processed. Thus, a single size roller can more efficiently process scalloped muscles of various diameters.

Preferably, the adjustment means of the present invention includes a pair of brackets mounted on each side of the eviscerator frame for individually adjusting the height of each support frame. It is also preferred that each bracket has an elongated slot and is movable within the limits of the elongated slot to various heights, and the adjustment means also includes means for securing each bracket to the eviscerator frame at any height within the slot.

Desirably, the drive means includes a drive motor mounted on each of the support frames and a speed reducer connecting the drive motor to each of the spreader fans. The spreader fans are preferably of a size and physical arrangement which permits the blades to reach the outermost edges of the inclined path. In addition, the blades of the lowermost fans are preferably able to reach down to the lowermost roller on the downward portion of their cycle and the blades of the uppermost fans are preferably able to reach up to the uppermost roller on the upward portion of their cycle.

It is to be understood that both the foregoing general description and the following detailed description are exemplary and explanatory but are not restrictive of the invention.

DETAILED DESCRIPTION OF THE INVENTION

The accompanying drawings, which are incorporated in and constitute a part of this invention, illustrate a preferred embodiment of the invention, and together with the description, serve to explain the principles of the invention.

The present machine for extracting the viscera from adductor muscles is applicable to scallops generally, including sea scallops, *Placopecten magellanicus*, bay scallops, *Aequipecten irradians;* and Calico scallops, *Aequipecten gibbus*. While the different varieties vary in size, their similar physiology allows them to be processed by the machine of the present invention. The machine of the present invention, however, is especially useful in eviscerating sea scallops because of their large size and the problems usually associated with the variations in their size.

As used in the specification and claims, the term scallop "meat" refers collectively to the adductor muscle and viscera.

It is desirable that the scallop meats to be eviscerated by the process of the invention be free of shell fragments and sand because these materials would interfere with the process. Preferably, the shucking method described in the above referred to U.S. Pat. No. 3,665,555 is used although any suitable shucking method can be employed.

Figure 1:
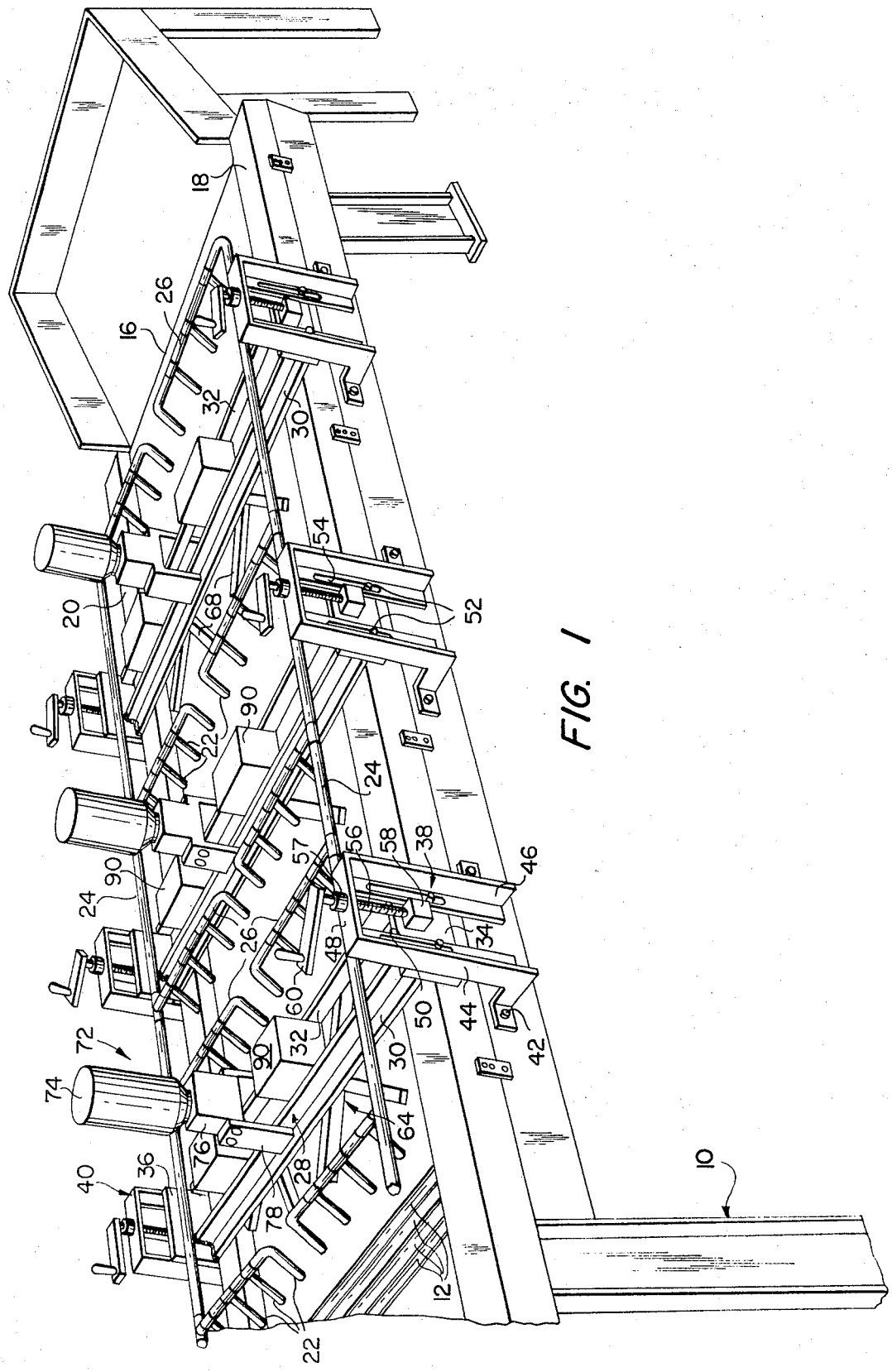
FIG. 1 is a schematic perspective view of an apparatus for extracting viscera from adductor muscles constructed in accordance with the invention.
Figure 2:
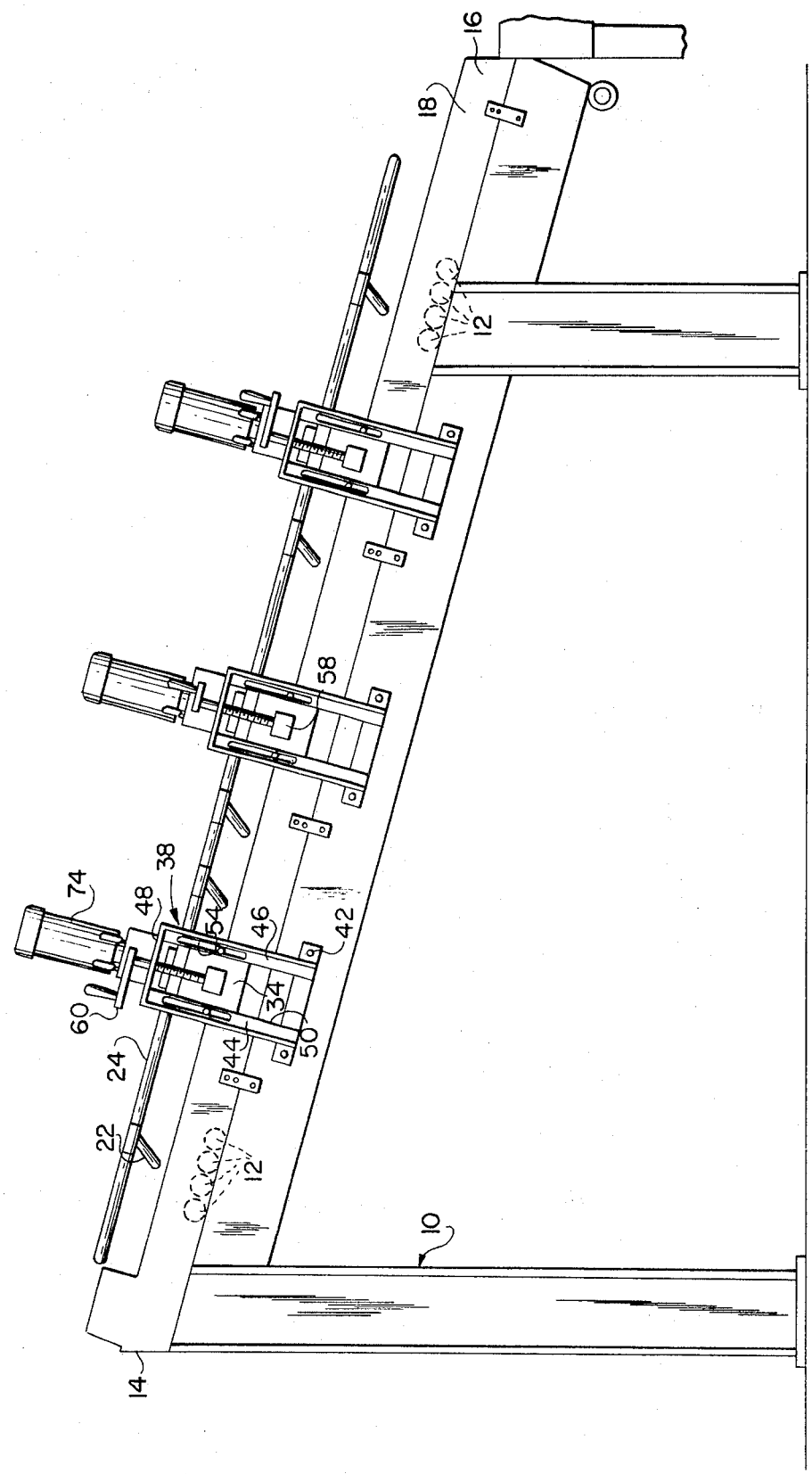
FIG. 2 is a partial side elevation view of the apparatus of FIG. 1.

Referring to the drawings and as best seen in FIGS. 1 and 2 the present invention is embodied in a scallop eviscerator having a main frame, generally 10, on which a plurality of rollers 12 are arranged to form a uniformly inclined path descending from an input end 14 of the eviscerator to an output end 16 of the eviscerator. It will be understood by those skilled in the art that rollers are provided along the entire length of frame 10, and only a small number of such rollers are shown in the drawings including a first group at the top or input end 14 of the eviscerator and a second group toward the output end 16 (FIG. 2). Each roller 12 has its axis aligned transversely of the inclined path and is positioned so that the surface of each intermediately positioned roller forms a nip with the adjacent roller on its input side and a nip with the adjacent roller on the output side. Drive means (not shown) are provided for oscillating the rollers so that the upper exposed portions of adjacent rollers are alternately rotated toward each other to pull viscera from the scallop muscles and through the nip of the rollers, and alternately rotated away from each other to permit the lower of the two rollers to advance the scallop down the inclined path.

Figure 3:
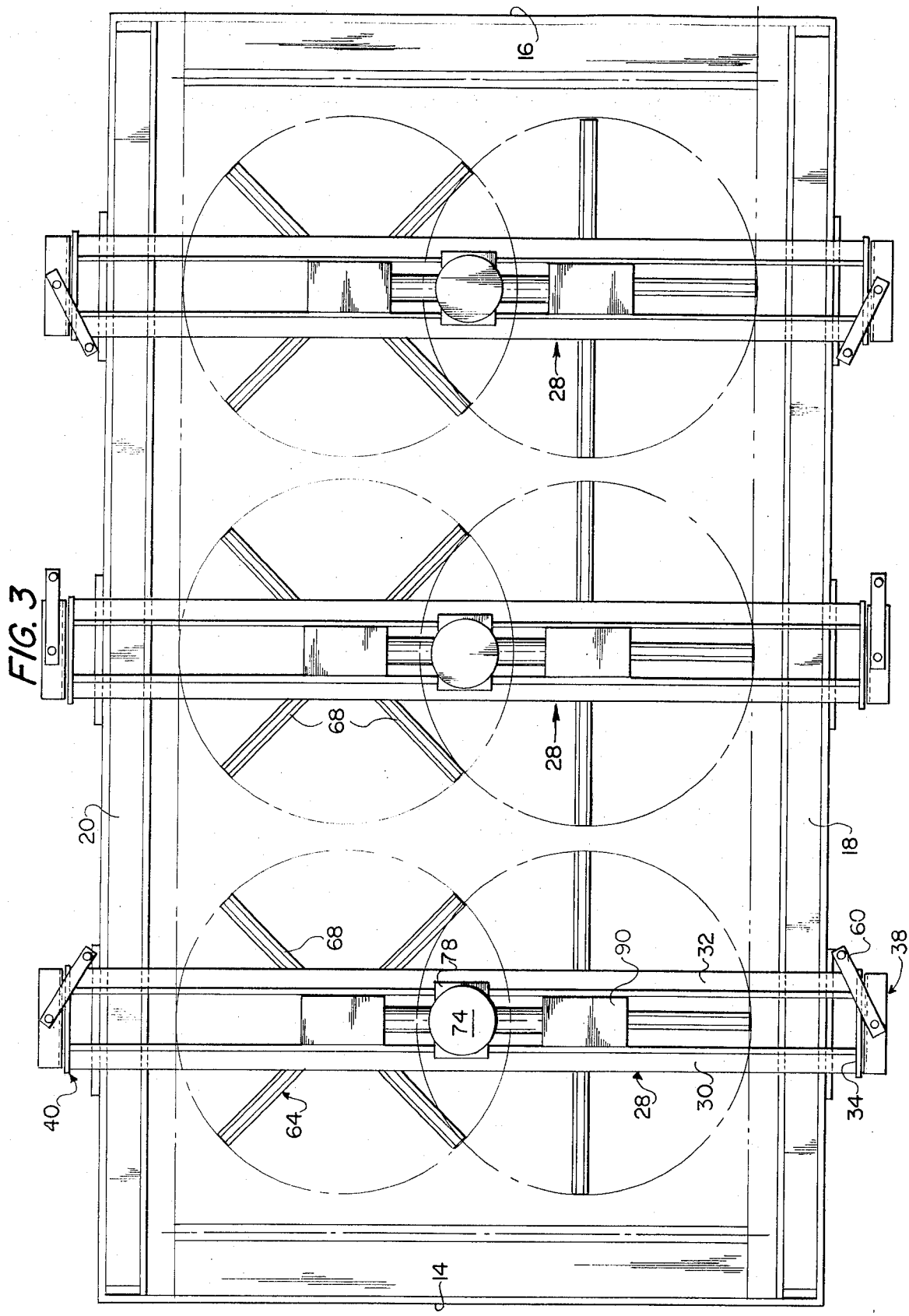
FIG. 3 is a plan view of the apparatus of FIGS. 1 and 2 taken perpendicular to the plane of the inclined path.

Eviscerator frame 10 includes a first side frame member 18 and a second side frame member 20 as illustrated in FIG. 3. Each side frame member 18 and 20 extends the length of the eviscerator and rollers 12 are suitably journalled into the inner vertical sides of side frame members 18 and 20 below the top surface of the side frame members. The slope formed by the incline of the roller path from the horizontal is preferably 10° to 15°. The bank of rollers is uniformly inclined gradually from the input end 14 of the eviscerator to the discharge end 16 of the eviscerator. Preferably, the surfaces of the rollers do not touch, and are spaced apart far enough to permit their rotation without making frictional contact.

Spray means are positioned above the inclined path formed by rollers 12 for directing a fluid under pressure on the scallop meats positioned on the rollers. When the fluid is selected to be a liquid of low viscosity, such as water, the spray means provides a lubricating film on the surface of the rollers that permits the scallop muscles to freely rotate about their cylindrical axes while supported by the rollers, thus exposing the entire peripheral surface of the muscles to the pulling action of the nip formed by the rollers.

As best seen in FIG. 1, the spray means includes a plurality of spray nozzles 22 that are longitudinally spaced on fluid conduits 24 along the path. The spray nozzles are also laterally spaced across the path. Spray nozzles 22 are each provided with an inlet conduit 26 connected, through fluid conduits 24, to a source of fluid under pressure, preferably water.

As illustrated in FIGS. 1 and 2, the direction of the fluid issuing from spray nozzles 22 is inclined upwardly with relation to the path formed by the rollers, and tends to impede the movement of the muscles down the path. It is desirable that the spray means be so arranged that substantially the entire upper surface area of the rollers can be continuously sprayed with the fluid.

In accordance with the invention, a support frame is mounted on the eviscerator frame and extends across the inclined path of the eviscerator frame down which the scallop meats are moved. As here embodied, the support frame, generally 28, comprises a pair of spaced, parallel angle members 30 and 32, which extend laterally across the eviscerator frame 10 from first side frame member 18 to second side frame member 20, but lie in a plane which is positioned above the upper surfaces of the side frame members. At their opposite ends, the angle members 30 and 32 are secured, as by welding or other suitable fastening means, to support plates 34 and 36, respectively.

In accordance with the invention, adjustment means are connected to the support frame for varying the height of the support frame above the eviscerator rollers. As here embodied, a pair of brackets, generally 38 and 40, are mounted on opposite sides of the eviscerator frame, being secured to their respective side frame members 18 and 20, as by suitable fasteners 42. The brackets 38 and 40 are generally of inverted U shape, having legs 44 and 46, formed preferably from angle stock, and a bight portion 48, all of which thereby define an interior recess 50.

In order to enable the height of the support frame 28 to be varied above the eviscerator rollers 12, the support plates 34 and 36 are preferably provided with a pair of studs 52, which are appropriately secured to their respective plates, and protrude in a direction away from their respective side frame members 18 and 20. The studs 52 are so positioned that they mate with slots 54 which are provided in the legs 44 and 46 and are slideably moveable along the length of the slots 54. Thus, the height of the support frame 28 is adjustable within the limits defined by the ends of the slots 54. The length of the slots 54 extend substantially perpendicular to bight 48, but because eviscerator frame 10 and support frame 28 are at an incline of about 10° to 15° to the horizontal, the length of slots 54 are at a similar incline to the vertical.

In accordance with a preferred embodiment of the invention, the adjustment means also includes screw means connecting the support frame to the brackets for varying the height of the support frame, as well as means for securing the support frame to the brackets at any height within the slot. As here embodied, and as particularly well seen in FIGS. 4 and 5, a worm shaft 56 is suitably journalled at its upper end in a bearing block 57 fixed on a central portion of the bight 48 and at its lower end, is threadedly engaged with a worm block 58 which is suitably fixed to support plate 34. A crank 60 is fixed to the free end of the worm shaft 56 to enable selective rotation of worm shaft 56. As the shaft is rotated, being in engagement with the worm block 58, it causes the block and, accordingly, its matching end of the support frame 28 to be raised or lowered. When a desired height of the support frame 28 above the eviscerator rollers 12 is obtained, the support frame can be secured at that position by tightening a pair of nuts 62 which are threadedly engaged with the studs 52.

It will be understood that it is preferable for purposes of the invention that the support frame 28, extending across the inclined path, remain in a plane which is parallel to that of the rollers 12. In other words, the adjustment means provided by the bracket 38 should be utilized in close conjunction with that of the bracket 40. This can be achieved by use of sighting with the naked eye, or by use of a level gauge which would inform the operator when the position of the support frame is proper, or by a mechanism (not shown) interconnecting the cranks 60, or by other suitable devices.

Figure 4:
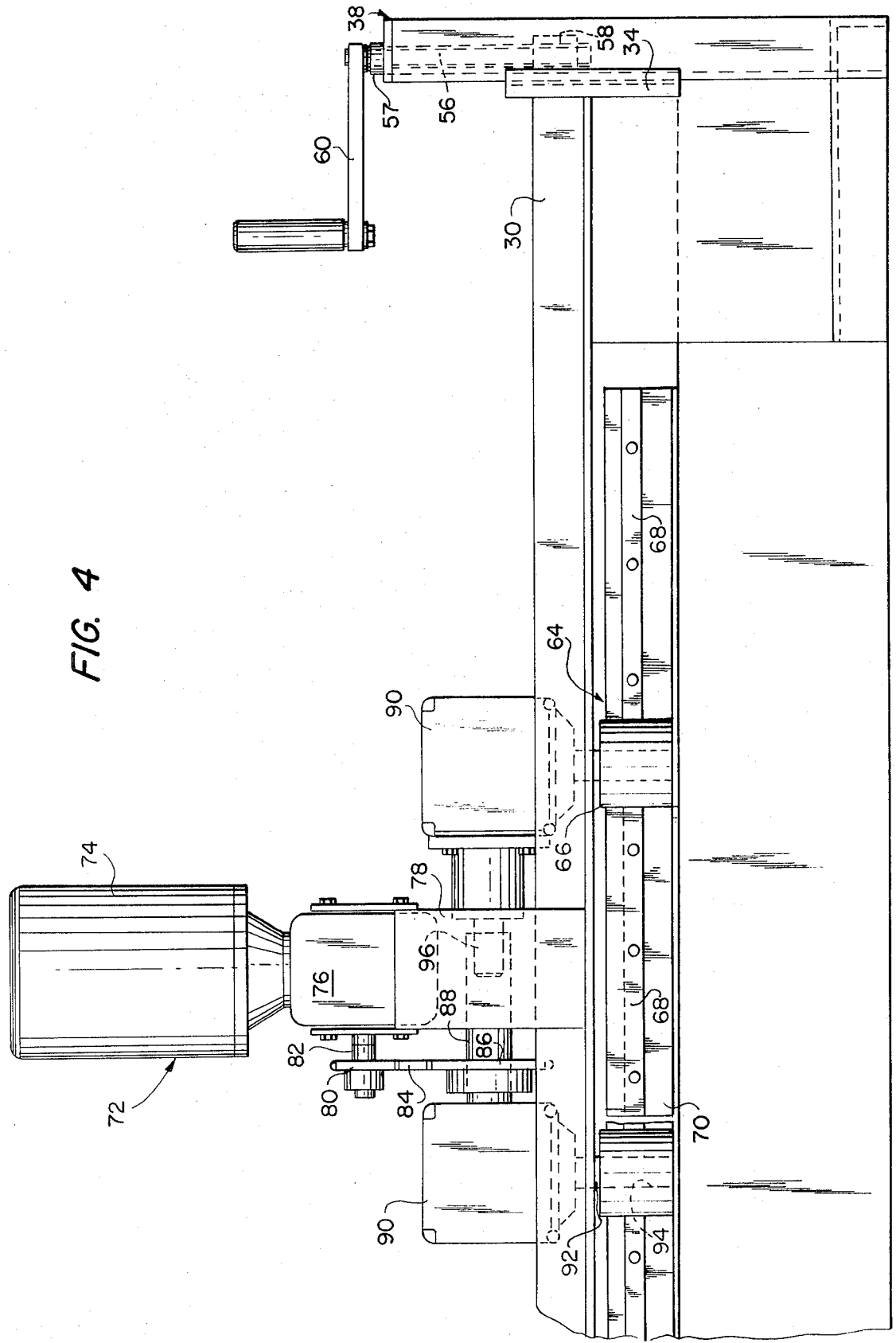
FIG. 4 is a partial front elevation view of the apparatus of FIGS. 1 and 2.
Figure 5:
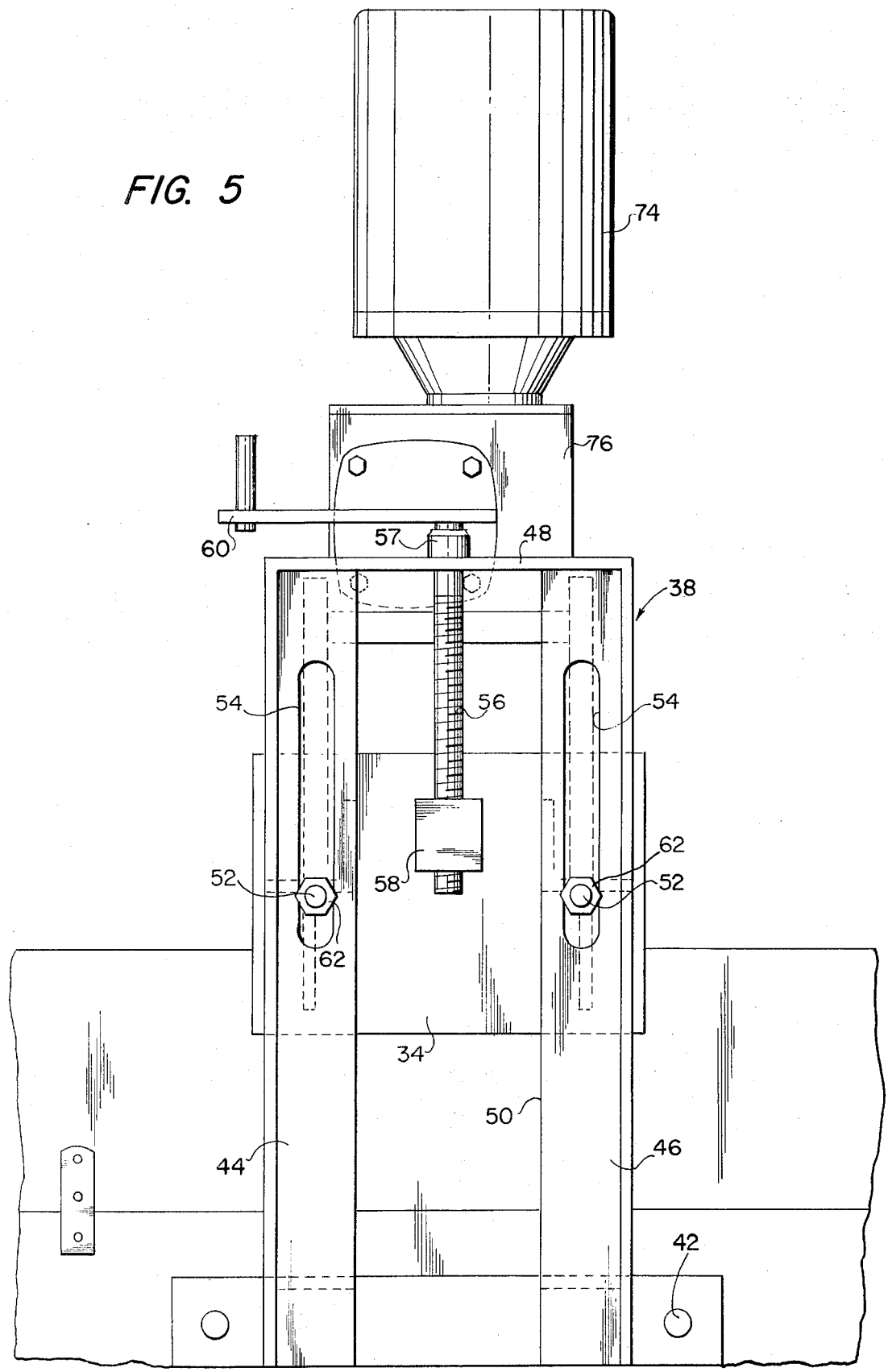
FIG. 5 is a detail end elevation view of certain portions most clearly illustrated in FIG. 2.

In accordance with the invention, a spreader fan is mounted on the support frame and has an axis of rotation substantially perpendicular to the plane of the rollers. As here embodied, and as best seen in FIG. 4, a spreader fan 64 comprises a hub 66 to which a plurality of blades 68 are suitably mounted. The blades 68 extend radially from the hub 66 and lie in a plane which is preferably parallel to that of the eviscerator rollers 12. To this end, it is preferred that the axis of the hub 66 be perpendicular to the plane of the rollers 12. Each of blades 68 is provided with an elongated flexible wiping element 70 composed of neoprene rubber or other suitable material. The wiping elements 70 fit along substantially the entire length of the blades 68 and extend downwardly toward the rollers 12.

In accordance with the invention, drive means are connected to the support frame for rotating the spreader fan in a plane parallel with the inclined path. As here embodied, the drive means, generally 72, includes a drive motor 74, which together with a speed reducer 76, is supported on a base 78 in a suitable fashion. In turn, base 78 is fixed to angle members 30 and 32 of support frame 28. A sprocket 80 is splined on an output shaft 82 extending from the speed reducer 76 and through a drive chain 84 powers a sprocket 86 splined to an input shaft 88 of an angle drive unit 90. An output shaft 92 from the angle drive units 90 extends through a centrally located bore 94 within hub 66 and is suitably secured to the hub.

Thus, through the speed reducer 76, the drive motor 74 drives sprocket 80 on output shaft 82. In turn, sprocket 82 drives sprocket 86 through drive chain 84 and thereby, the angle drive unit 90 via its input shaft 88. This results in a rotation of output shaft 92 and with it, spreader fan 64. Since it is desirable that blades 68 rotate at a speed substantially less than the output from motor 74, speed reduction is obtained by use of speed reducer 76, by reason of the relative sizing of sprockets 80 and 86, and may further be achieved, if desirable, by the mechanism internal to angle drive unit 90.

In accordance with a preferred embodiment of the invention, the scallop spreading machine comprises a plurality of similar spreader fans mounted on the support frame in side-by-side relationship across the inclined path of the eviscerator frame, each spreader fan including a plurality of radially extending blades, each having a flexible wiping element, all of which lie in a plane spaced from, and parallel to the plane of the rollers, the axes of the spreader fans being spaced apart a distance less than a diameter of the spreader fans, and the spreader fans being synchronized out of phase to permit the blades of the respective spreader fans to intermesh. As here embodied, and as best seen in FIG. 4, a pair of speed reducers 90 are laterally disposed, relative to the base 78 and are joined by a suitable coupling 96. As most readily seen in FIG. 4, the hubs 66 of adjacent spreader fans 64 are mounted in side-by-side relationship on the support frame 28 and spaced apart by a distance which is substantially less than the combined radii of blades from each adjacent spreader fan. That is, the arcs of the adjacent spreader fan blades overlap, and for this reason, it is necessary that the blades 68 of one spreader fan be synchronized out of phase with the blades of its adjacent and cooperating spreader fan.

In accordance with a preferred embodiment of the invention, the scallop spreading machine also comprises a plurality of parallel support frames mounted on the eviscerator frame at spaced locations along, and extending across the inclined path of the eviscerator frame, the axes of the spreader fans mounted on adjacent support frames being spaced apart a distance greater than a diameter of said spreader fans, whereby the blades of the spreader fans on adjacent support frames do not inter-mesh. As here embodied, and as best seen in FIG. 3, a plurality of support frames 28 are mounted on the eviscerator frame 10 at spaced locations along the inclined path of the main frame 10. Each support frame 28 extends across the inclined path of the main frame 10 in a manner previously described, and each such support frame is separated from its neighboring support frame by a distance which is greater than the sum of the radii of their associated blades 66. That is, the arcs of the spreader fans 64 on the neighboring support frames 28 do not overlap, as do the arcs of the adjacent spreader fans 64 of each support frame 28, but rather, they are separated. In this manner, the spreader fans 64 on one support frame 28 do not interfere with the spreader fans 64 on its neighbor support frame, but rather, they operate in a supplementary fashion. It should be understood, of course, that is desired the support frame 28 could be so positioned that their respective spreader fan blades would intermesh.

In operation, scallop meats are placed on the upper surface of the inclined path formed by the plurality of rollers 12 having their axes transverse of the path. The initial orientation of scallop muscles on the path is immaterial, as the cylindrical adductor muscle is soon oriented by rollers 12 so that the axis of the muscle is generally parallel to the rollers. In this position, the muscle rotates about its axis and exposes the viscera around substantially its entire periphery to the nip formed by each pair of adjacent rollers. The viscera is pulled from the muscle and through the nip formed by adjacent rollers when the upper portion of adjacent rollers rotate towards each other. The rollers exert a frictional pulling force on the viscera in a downward direction through the nip of the rollers while at the same time restraining movement of the scallop muscle.

The rollers are oscillated (counter rotated) so that they alternate between pulling viscera from the muscle and advancing the muscles down the path. The degree of rotation of the upper portion of the rollers towards each other is preferably at least 360° for rollers at the top of the path, but the degree of rotation of rollers located lower in the path can be reduced below 360°.

During rotation of rollers 12, the blades 68 and their associated wiping elements 70 are rotated at a speed preferably in the range of 15 to 18 r.p.m. over the bank of rollers 12 in a plane parallel to the inclined path. Each drive motor 74 operating through its associated speed reducer 76 rotates the sprocket 80 on the output shaft 82. In turn, sprocket 80 acting through drive chain 84 drives the sprocket 86 on the shaft 88 which in turn, operates each of its associated angle drive units 90. As previously described, the output shafts 92 of their associated angle drive units 90 rotate in the same direction with the blades 68 of adjacent spreader fans 64 being synchronized out of phase.

The blades 68 are thereby rotated slowly over the upper surface of the rollers 12 such that the wiping elements 70 engage those clumps or piles of scallops which have formed on the upper surface of the rollers 12. As the wiping elements advance, they tend to distribute the scallops more evenly on the rollers, and to position them so as to subject them to the action of the eviscerator. In addition, during that portion of the cycle in which the wiping elements operate upward along the inclined path on the eviscerator frame, they act to force the scallops back up the inclined path, and thereby lengthen the time the scallops are subjected to the action of the eviscerator. The blades 68 with their accompanying wiping elements 70 can be so sized and positioned that they act upon the entire width of the inclined path. Furthermore, with a plurality of support frames 28 located at spaced positions along the eviscerator frame, essentially every scallop entering the spreading machine at the input end 14 will have been properly operated upon by the time it reaches the output end 16.

Finally, the spreader fans 64 further aid in removing viscera from the scallop meats by exerting a turning force on the scallop meats, and thereby insure that the viscera is brought to a position just above the nip formed by a pair of adjacent rollers 12 where the viscera can be pulled from the muscle. The wiping elements 70 also tend to force larger size scallops into the nip of adjacent rollers 12.

The height of the wiping elements 70 can be adjusted by means of the cranks 60 to meet any processing condition that may arise and enables the eviscerator to function in an efficient manner when processing scallops of various sizes. Ordinarily, the wiping elements are adjusted so that the clearance between the bottom of the spreader fans and the top of the eviscerator rollers is slightly less than the diameter of the scallops being processed.

The spreading device of this invention thus helps to feed scallop viscera into the nips formed by the rollers, aids in distributing the scallops transversely of the inclined path, and provides a means for moving scallop meats back up the inclined roller path to increase the number of times a scallop muscle is subjected to a given nip formed by a pair of rollers. All these functions tend to permit using a smaller eviscerator formed by a smaller number of rollers. The invention thus can provide a more compact overall eviscerator.

The invention in its broader aspects is not limited to the specific details shown and described and departures may be made from such details without departing from the principles of the invention and without sacrificing its chief advantages.

What is claimed is:

1. A scallop spreading machine for use with a scallop eviscerator formed by a plurality of counter-rotating rollers rotatably mounted on a frame to form an inclined path, with the axes of the rollers aligned transversely of the path, said spreading machine comprising:
   a. at least one support frame mounted on the eviscerator frame and extending across the inclined path of the eviscerator frame;
   b. adjustment means connected to said support frame for varying the height of said support frame above the eviscerator rollers;
   c. at least one rotary spreader fan mounted on said support frame having an axis of rotation extending in the direction of the rollers, said axis being substantially perpendicular to the plane of the rollers, and said fan having blades radiating outwardly from said axis for distributing the scallop meats more evenly on the rollers, lengthening the time the scallops are subjected to the action of the eviscerator rollers and urging the scallops into the nips of the rollers; and
   d. drive means connected to said support frame for rotating said spreader fan blades in a plane parallel with the inclined path.

2. The device of claim 1 wherein said adjustment means includes a pair of brackets mounted on opposite sides of the eviscerator frame, each bracket having an elongated slot, a stud fixed at each end of said support frame and engageable with said slots, permitting movement of said support frame within the limits of the elongated slot to various heights, varying means connecting said support frame to said brackets for varying the height of said support frame, and fastening means for securing said support frame to said brackets at any height within the slot.

3. The device of claim 2 wherein said fastening means includes nuts threadedly engaged with said studs for securing said support frame at a desired height above the eviscerator rollers.

4. The device of claim 2 wherein said varying means includes a worm screw shaft rotatably mounted on each of said brackets and a worm block fixed at each extremity of said support frame in threaded engagement with said worm shaft, and a crank fixed to said worm for rotating said worm for varying the height of said support frame above the eviscerator rollers.

5. The device of claim 1 wherein said spreader fan includes a plurality of radially extending blades with each blade having a flexible wiping element, all of said wiping elements lying in a plane spaced from and parallel to the plane of the rollers.

6. The device of claim 1 wherein said scallop spreading device comprises a pair of spreader fans mounted on said support frame in side-by-side relationship above the inclined path of the eviscerator frame, each spreader fan including a plurality of radially extending blades with each blade having a flexible wiping element, all of said wiping elements lying in a plane spaced from and parallel to the plane of the rollers, the axes of said spreader fans being spaced apart a distance less than a diameter of said spreader fans and said spreader fans being synchronized out of phase to permit the blades of the respective spreader fans to intermesh.

7. The device of claim 6 wherein said blades extend substantially across the path of the eviscerator frame.

8. The device of claim 6 wherein said scallop spreading device includes a plurality of parallel support frames mounted on the eviscerator frame at spaced locations along and extending across the inclined path of the eviscerator frame, the axes of said spreader fans mounted on adjacent support frames being spaced apart a distance greater than a diameter of said spreader fans whereby the blades of the spreader fans on adjacent support frames do not intermesh.

9. The device of claim 8 wherein said drive means includes a drive motor mounted on each of said support frames, and speed reduction means connecting said drive motor to each of said spreader fans.

* * * * *